United States Patent
Chevalier et al.

[11] 3,813,530
[45] May 28, 1974

[54] HIGH SECURITY DIGITAL CONVERSION AND TRANSMISSION SCHEME FOR A CLOSED LOOP CONTROL SYSTEM

[75] Inventors: Gabriel Chevalier; Gilbert Gatel, both of Grenoble, France

[73] Assignee: Societe Generale De Constructions Electriques et Mecaniques, Paris, France

[22] Filed: Apr. 4, 1973

[21] Appl. No.: 347,837

[30] Foreign Application Priority Data
Apr. 5, 1972 France .................... 72.11974

[52] U.S. Cl. ............................................ 235/153 A
[51] Int. Cl. ................................................ H03k 13/34
[58] Field of Search ............... 235/153 A, 153 AC; 340/172.5, 347 AD, 347 DA, 347 DD

[56] References Cited
UNITED STATES PATENTS

| | | | |
|---|---|---|---|
| 3,469,084 | 9/1969 | Garrett et al. | 235/153 A |
| 3,603,772 | 9/1971 | Paine | 235/153 A |
| 3,659,273 | 4/1972 | Knauft et al. | 235/153 A |

Primary Examiner—Charles E. Atkinson
Attorney, Agent, or Firm—Arthur O. Klein

[57] ABSTRACT

A system of security checks is incorporated in each of a plurality of separately addressable analog-digital and digital-analog converters in a control system supervised by a computer. Each converter is normally inactive and is conditioned for operation when a coded address applied thereto by the computer coincides with a preset unique address of the converter. In the case of analog-digital converters, the computer responds to a signal indicating such conditioning by operating the then-addressed one of the conditioned converter to translate the measured analog data at its input into digital form. In the case of the digital-analog converters, the signal indication denoting the conditioning of the converter causes command data from the computer to be entered from the computer to an output register of the converter. A subsequent verification of the computer between a stored version of the command data and a replica of the data entered into the conditioned converter effects the operation of the converter to translate the data entered into its input register into analog form.

6 Claims, 7 Drawing Figures

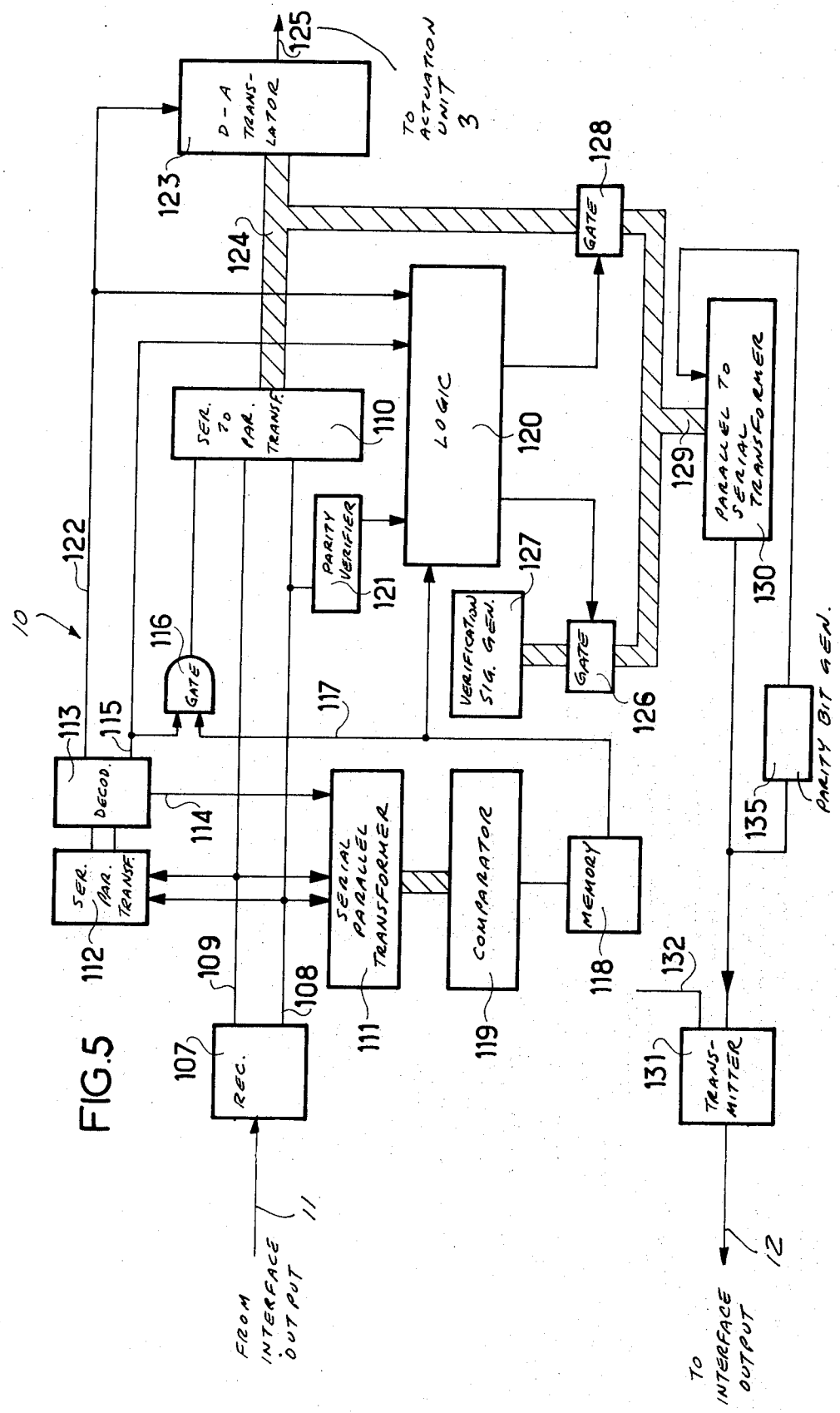

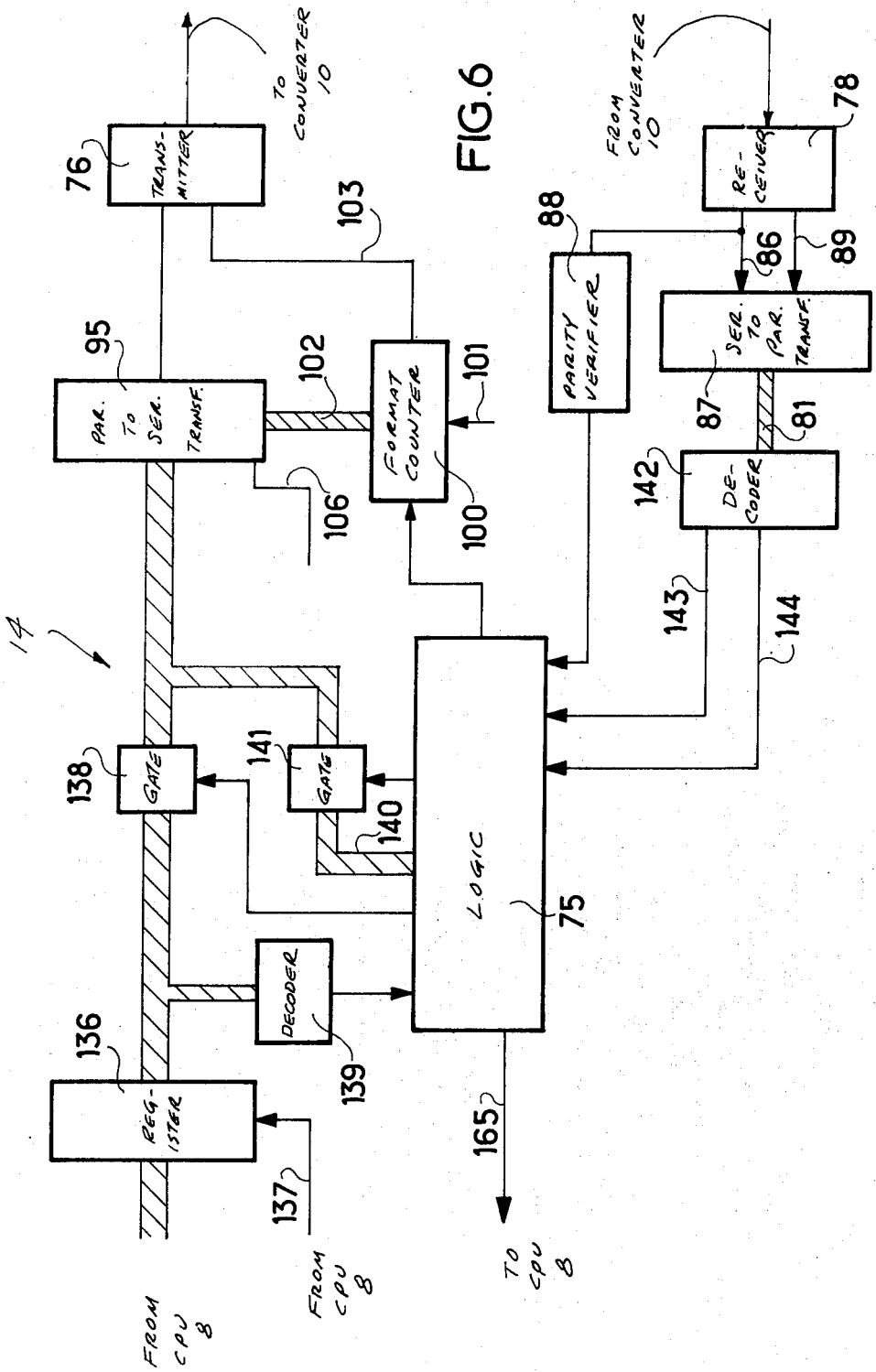

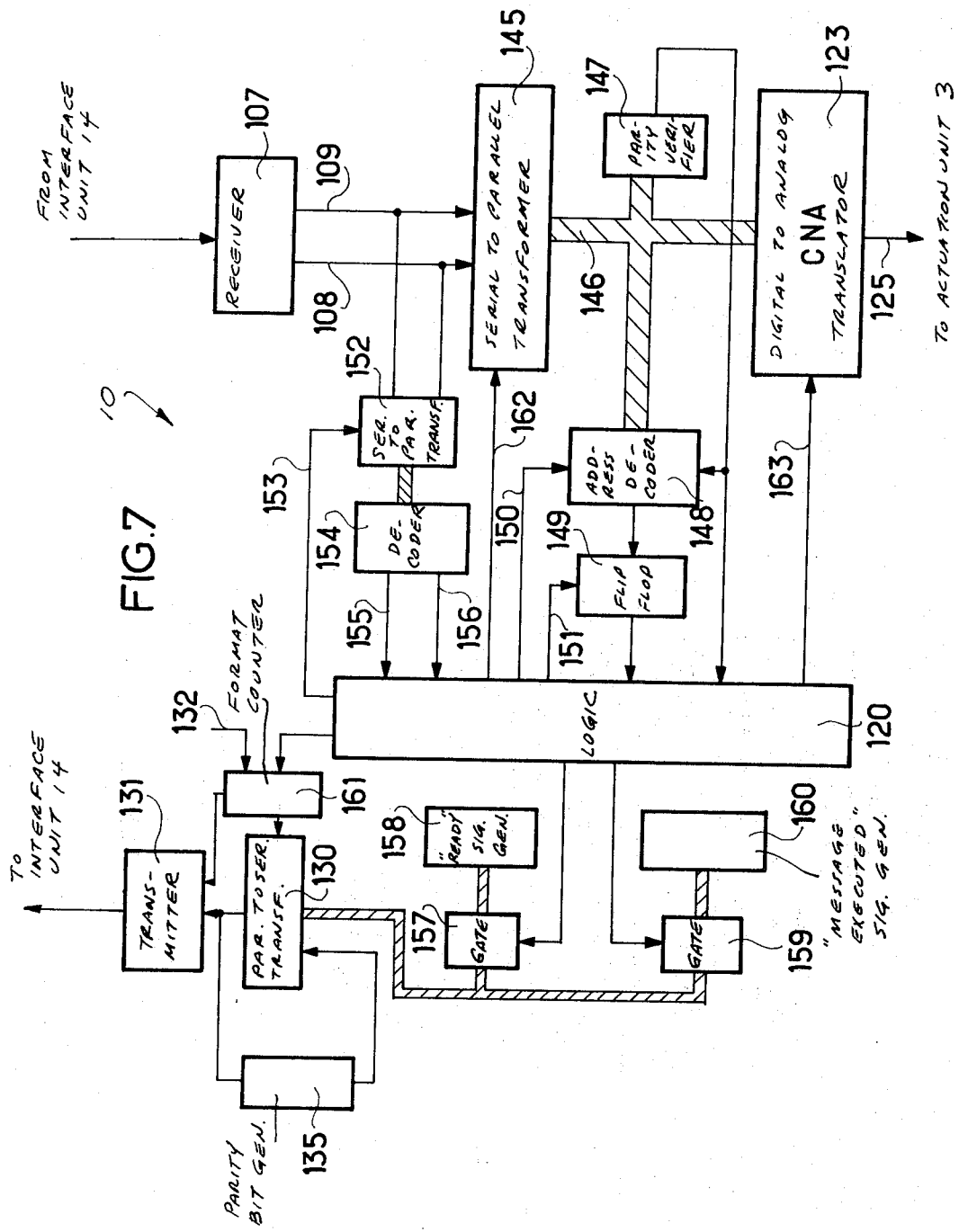

HIGH SECURITY DIGITAL CONVERSION AND TRANSMISSION SCHEME FOR A CLOSED LOOP CONTROL SYSTEM

BACKGROUND OF THE INVENTION

Many control systems for remotely regulatory complex industrial processes, command and guidance systems for space vehicles, and the like, employ a digital computer to which the various outputs of the controlled system a process may be coupled. In earlier arrangements of this type, such outputs, which may be sensed by individual local detecting units at widely spaced points, were transmitted to the computer in low-level analog form over long, high-quality communication paths. In response, the computer would generate the required command signals and transmit them to suitable actuating units locally associated with the inputs of the controlled systems.

Additionally, an analog multiplexer associated with the computer would receive the measured analog signals from the different outputs of the system and successively apply such signals to the input of a common analog to digital converter, which translates the signals into a form usable by the computer. The information processed by the computer would then be applied to a common digital to analog converter at the output and again multiplexed to provide separate analog commands for transmission over the long lengths of communication line to the appropriate actuating units for the controlled system inputs.

In these arrangements, the long lengths of high-quality communication line necessary to faithfully transmit low-level analog signals are quite expensive. Moreover, such lengths of line must be effectively shielded against parasitic capacitances and other spurious inputs which generate analog disturbances that can easily exceed the desired analog measured and control signals on the line. And even where effective shielding is used, it is frequently found that unavoidable differences in grounding potentials at different points of the line contribute further disturbances to the transmitted signal.

An important improvement on such arrangement which has been proposed contemplates the local association, with each detecting unit at the output of the controlled system, of a separate analog to digital converter. Each such converter is operated under the control of a unique address code provided by the computer. A single low-grade, relatively inexpensive communication line may then be provided to carry multiplexed digital outputs of each of such converters to the computer. The discrete digital signal pulses on such line are much less susceptible to severe signal distortions of the kinds indicated above.

In like manner, a separate digital to analog converter is locally associated with each actuation unit of the controlled system, and may be addressed, commanded, and multiplexed in digital form by suitable means over a common low-grade communication line.

Besides the cost savings attributable to the cheaper communication line, additional savings accrue in the revised arrangement in that multiplexing is more efficiently and cheaply done in digitial form, and in that in any event the individual converters for translating between analog and digital forms need only operate at a fraction of the rate necessary for the common analog-digital and digital-analog converters employed in the prior system.

Even with this improved arrangement, however, the address and data messages in digital form which are transmitted to and from the computer are subject to residual errors in transmission and conversion.

SUMMARY OF THE INVENTION

Accordingly, the present invention is directed to a high security system for effecting accurate digital transmission and conversion in a closed-loop, computer-supervised control system of the improved type discussed above. In an illustrative embodiment, suitable means are associated with each digital-analog and analog-digital converter so that the function of such converter is subject to at least one verification in the computer before the information at the converter input can be translated into the complementary form. In particular, suitable means are provided for ascertaining a coincidence between the incident address and an internally stored address of the converter and for operating the translating portion of such converter only when such coincidence is present.

Additionally, each of the digital-analog converters associated with the controlled system inputs is subject to a second data verification check after the command data for the input of the controlled system is coupled to the input digital register of such converter from the computer in response to the first address verification check. Such second check includes, in one embodiment, the transmission back to the computer of a replica of the command data received in the input register of the converter from the computer. The computer compares a stored version of the original command data with the received replica, and permits the actual translation operation on such data to proceed only when a coincidence exists between these two quantities.

If desired, a portion of the processing load normally handled by a program in the computer may be effectively shifted to the analog-digital converters associated with the measured outputs of the controlled system. This is done by employing threshold comparator means in such converter for suppressing the portion of the translated information which represents measured outputs outside of a predetermined useful range.

BRIEF DESCRIPTION OF THE DRAWING

Other characteristics and features will be described in the following detailed description taken in conjunction with the appended drawing, in which:

FIG. 5 is a block diagram of a first embodiment of a high-security digital to analog converter suitable for use in the arrangement of FIG. 1;

FIG. 6 is a block diagram of an alternative embodiment of an output interface unit of the processor of FIG. 1; and FIG. 7 is a block diagram of an alternative embodiment of a digital-analog converter suitable for use in the arrangement of FIG. 1.

DETAILED DESCRIPTION

Figure 1:
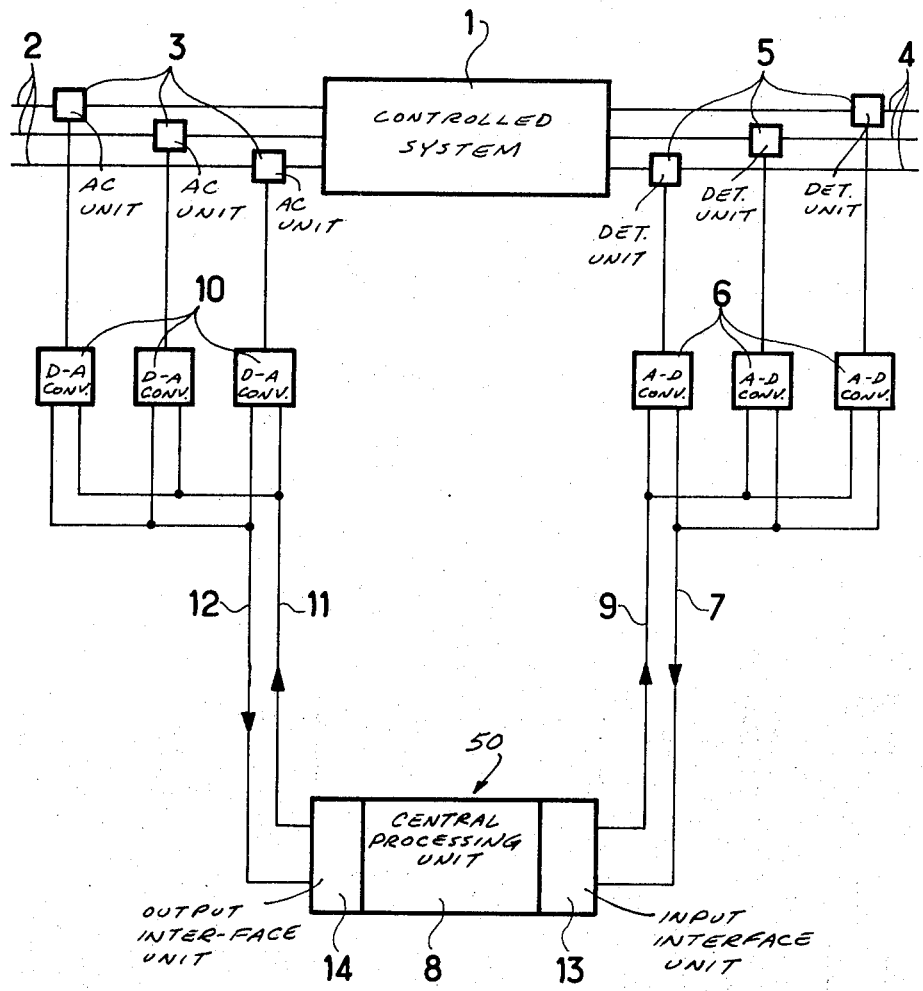
FIG. 1 is a block diagram of an illustrative closed-loop control system employing digital transmission and processing controlled by a central processing unit.

Referring now to the drawing, FIG. 1 illustrates a closed-loop regulating arrangement including a computer 50 for controlling the operation of a system 1. The system 1 has M-inputs and N-outputs. (Illustratively $M = N = 3$) although in the general case different arbitrary members of inputs and outputs may be employed.

Analog command signals are applied from suitable regulating sources (not shown) on lines 2 — 2 to each input of the system 1 via first inputs of a first plurality of actuating units 3 — 3. The resulting analog output signals of the system 1 are coupled through first inputs of detecting units 5 — 5 to suitable utilization apparatus (not shown) on output lines 4 — 4.

In order to effect closed-loop regulation of the system 1, an auxiliary analog output of each of the detecting units 5 — 5 is applied to an analog input of an associated one of a plurality of controlled analog-digital converters 6 — 6 ("first converters"); each such first converter is provided with security means, described below, in accordance with the invention.

The digital output of each first converter 6 is coupled via common line 7 to an input interface unit 13 of the computer 50 upon the occurrence of both of the following: (1) The application to the converter of a suitable unique address code via a common line 9 and (2) verification of the correctness of such applied address in the unit 14, as explained later. The digital data incident over the line 7 to the interface unit 13 is manipulated in a central processing unit 8 of the computer 50. Suitable address and command messages from the unit 8 are selectively and sequentially applied via an output interface unit 14 of the computer 50 and a common line 11, to first inputs of each of a plurality of controllable digital to analog converters 10 — 10 ("second converters"). Analog output signals from each second converter are coupled to the associated actuation unit 3 upon the occurrence of all of the following: (1) The application to the converter of a suitable unique address code via the line 11; (2) verification of the correctness of such applied address in the unit 14; (3) application of the digital command message to be translated to the input of the converter 10 in response to a verification pursuant to (2); comparison, in the unit 14, of an internally stored version of such digital command with a replica of the command received by the converter 10 in (3), as suitably transmitted back to the unit 14 by the converter 10; and (4) a coincidence between the stored command and the received replica.

Error signals representative of the difference between the command outputs on the individual lines 2 — 2 and the outputs of the converters 10 — 10 are coupled via actuation units 3 — 3 to the inputs of system 1 in a conventional manner.

Figure 2:
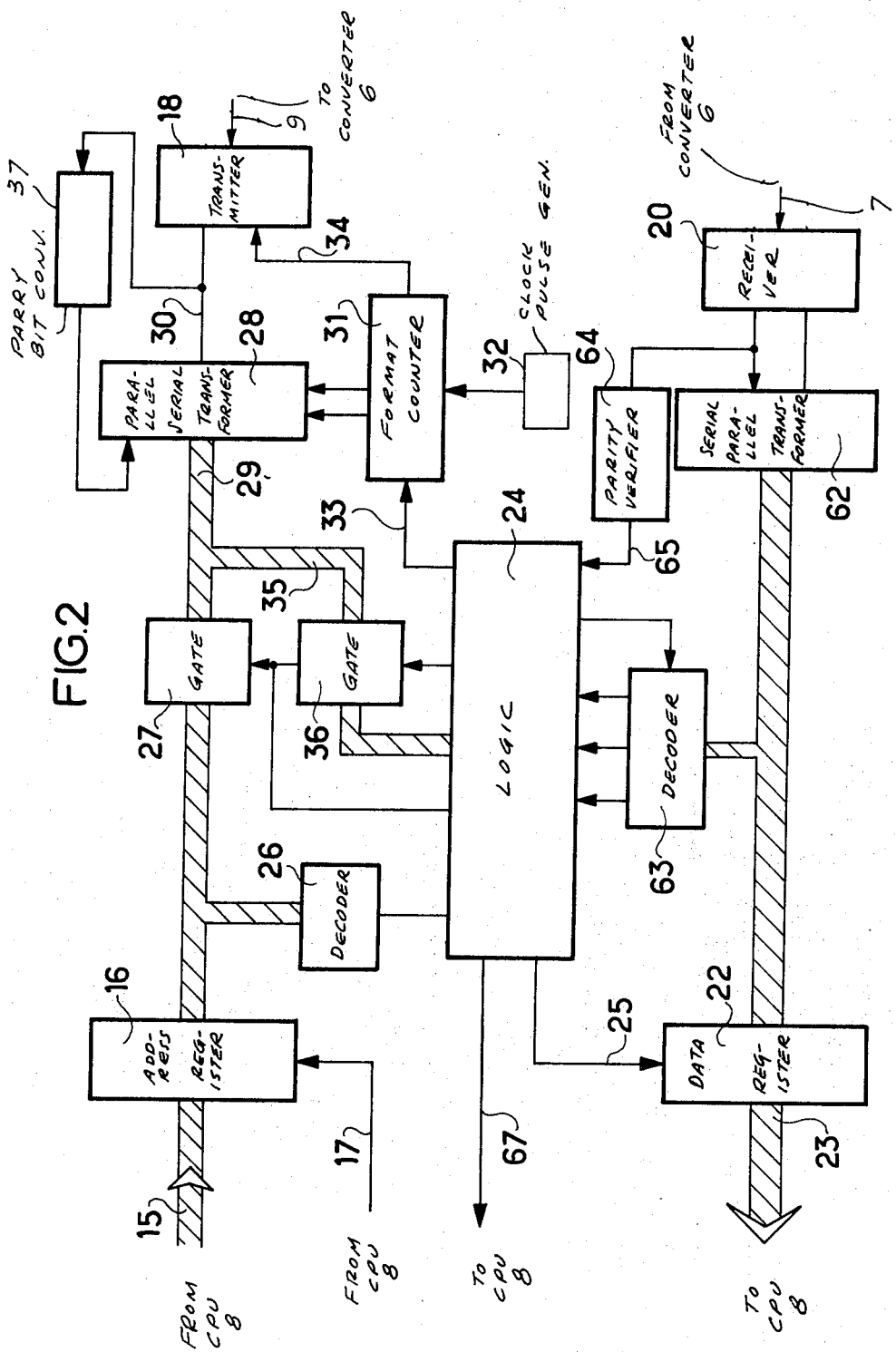
FIG. 2 is a block diagram of an input interface unit of a computer suitable for regulating the system of FIG. 1.

The output interface unit 14 is exemplified in FIG. 2, wherein parallel digital signals are represented by cross-hatched lines and serial digital signals are represented by plain lines. An address code representative of the identification of a typical one of the first converters 6 is entered in a register 16 when the latter is opened via a trigger on line 17. Such entry, decoded in a unit 26, is applied to logic 24 which opens gates 27 and 36. This action transfers, to a parallel-serial transformer 28, the address code and at [appropriate times] various security signals and responses from the logic 24. Such action additionally enables a conventional format counter 31, which supplied a pulse train of a predetermined number of pulses (entered therein from a clock pulse source 32) to the transformer 28 to effect the conversion of the parallel input information applied thereto into serial form on line 30. A parity bit is illustratively added at the end of the resulting serial digital signal for error checking purposes, by a parity bit generator 37.

A transmitter 18 outpulses the serial output on the line 30 along with the sequence of clock pulses from the format counter 31. Such outpulsed information, applied to the common line 9, is applied to an input receiver 40 (FIG. 3) in each of the first converters 6. The receiver 40 separates the transmitted clock pulse sequence from the address code and security signals on lines 41 and 42, respectively. The clock pulses on line 41 serve to synchronize the operation of a pair of serial to parallel transformers 38 and 39.

The address code exhibited on line 42, after conversion in transformer 38, is compared in a unit 43 with an internally stored unique address code associated with the individual converter 6. If the incident address code and the stored address code coincide, a trigger signal is applied to flip-flop 44 to switch its output state.

Such change of state causes logic 45 to open a gate 52 to send a security (verification) signal from generator 53 back to the interface unit 13 via parallel to serial transformer 56 and transmitter 57.

Such change of state of the flip-flop 44 also causes the logic 45 to enable, via line 48, an analog to digital translator 47 whose analog input is coupled to the output of the associated detecting unit 5 (FIG. 1). The translator 47 (FIG. 3) is thereupon operated to convert the analog signal to digital form. Upon the completion of such translation, the translator 47 applies an indication to logic 45 via line 51. This serves, via line 55, to open gate 54 and transfer the output of the translator 47 to the input of the parallel to serial transformer 56.

When the above-mentioned validation signal from generator 53 arrives at the receiver 20 (FIG. 2) of the interface unit 13, it is decoded at 63 and the resulting excitation of logic 24 causes the transmission of a security (transfer) order back to the logic 45 of the converter 6 via gata 36, transformer 28, transmitter 18, receiver 40 (FIG. 3) and units 39 and 46.

The receipt of such transfer order by the logic 45 triggers line 66 to operate format counter 58 and thus convert the parallel data input of transformer 56 (previously applied thereto from the translator 47) into serial form. Such serial data is transmitted, along with a parity bit from generator 60 to one input of the transmitter 57. Such transmitter couples such information, together with the clock pulse sequence from the format counter 58, to the receiver 20 of the interface unit 13 (FIG. 2).

At the receiver, the parity of the received information is checked in verifier 64 and, if incorrect, the logic 24 transmits a suitable alarm signal to the logic 45 of the converter 6. If the parity is correct, the incoming data is converted to parallel form in transformer 62 and stored in data register 22 to await processing in the central processing unit 8. Notification to the unit 8 that such data is available for processing is accomplished by logic 24 in exciting a "data available" line 67 to the unit 8.

Figure 3:
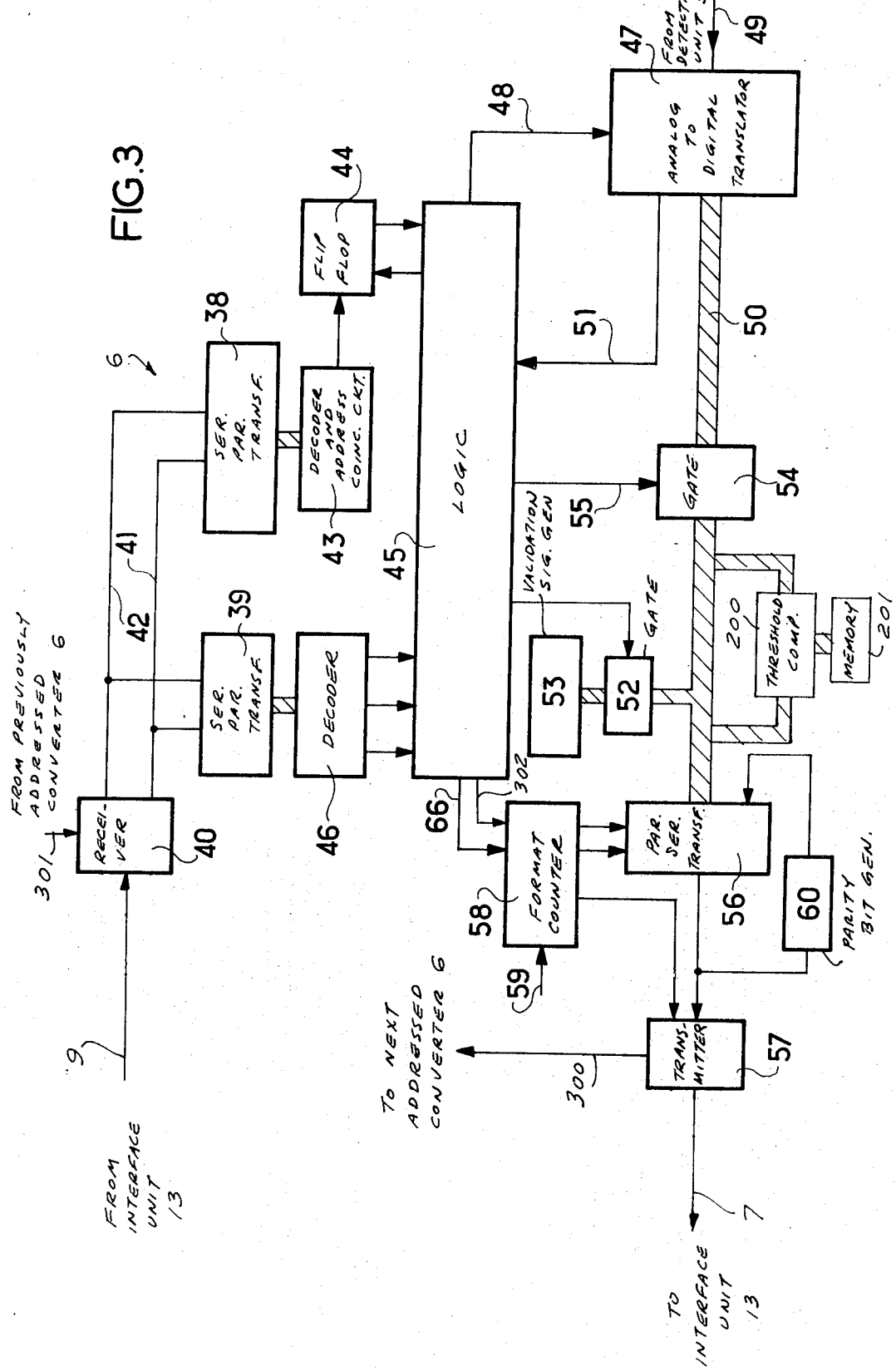
FIG. 3 is a block diagram of a high-security analog-digital converter suitable for use in the arrangement of FIG. 1.

As an added optional feature in the arrangement of FIG. 3, a threshold comparator 200 may be interposed in a shunt path between the output of gate 54 and the input of the transformer 56. The digital equivalent of the measured analog signal from detecting unit 5 is applied via gate 54 to one input of the comparator 200. Digital quantities representative of a predetermined range of useful levels of the measured analog signal from detecting unit 5 are applied to the second input of comparator 200 from memory 201. The comparator 200 thus yields an output only when the digitized measured signal exceeds a predetermined useful threshold, and such comparator output represents in coded form the amplitude of the deviation of the measured signal from the threshold. In this way, only signals in a predetermined range of measured outputs from the system 1 (FIG. 1) are referred to the central processing unit 8 for processing, thereby permitting a simpler and more accurate program for the unit 8.

As a second optional feature in FIG. 3, a "fast" data transfer mode may be instituted in each converter 6. Facilities are provided in the transmitter 57 for outpulsing, at the conclusion of each set of data transferred thereby to the interface unit 13, a control indication over a line 300 to the receiver of the converter 6 next to addressed by the unit 13. (Illustratively, such output indication is received by each successive converter from the preceding converter via input line 301.) The receipt of such control indication automatically causes the logic 45 to apply an auxiliary command over line 302 to the format counter 58, thereby enabling such counter. This action effects the automatic transmission, to the interface unit 13, of the digitized measured output from the detecting unit 3 then stored in the transformer 56.

Figure 4:
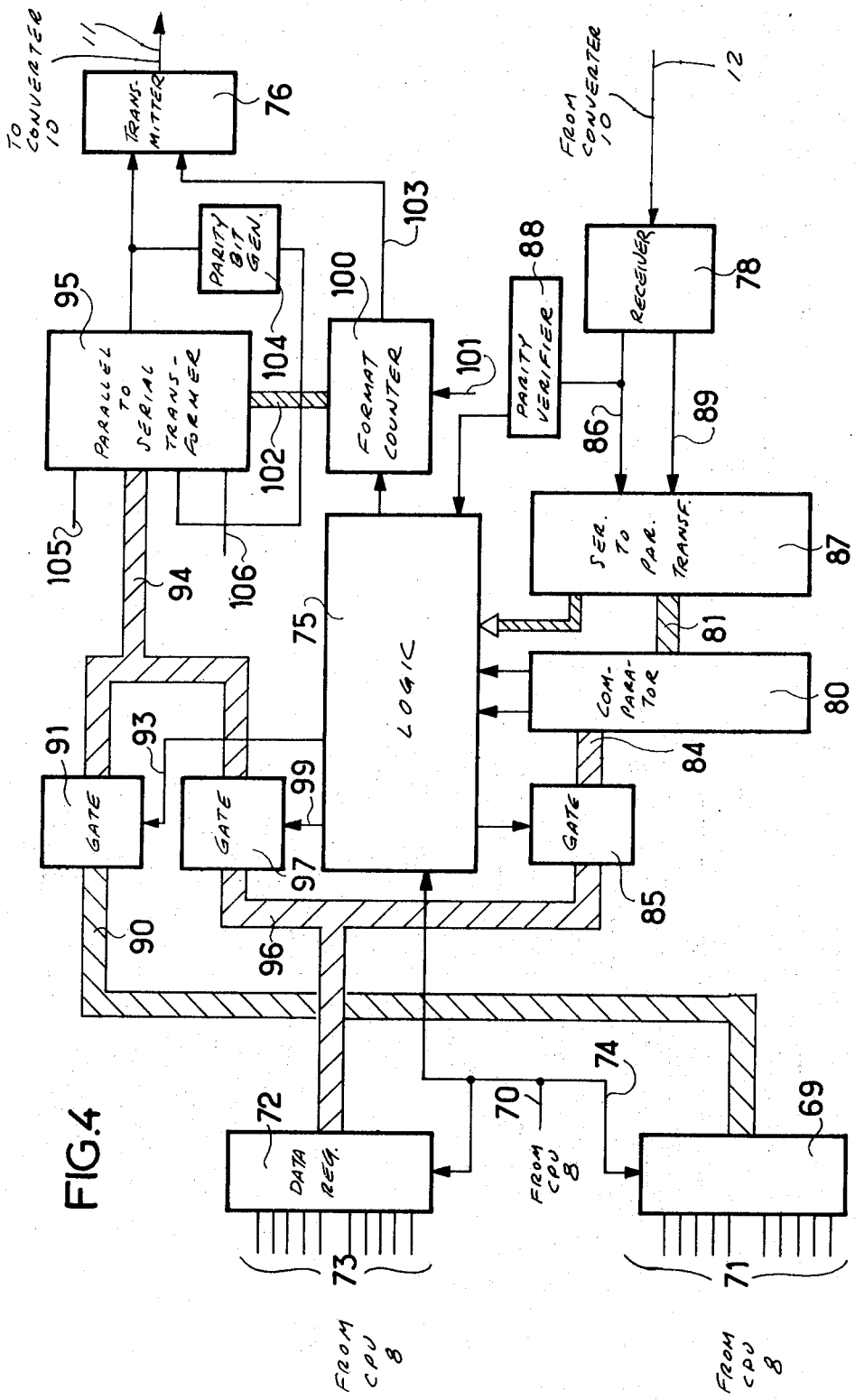
FIG. 4 is a block diagram of a first embodiment of an output interface unit of the processor of FIG. 1.

In FIGS. 4 and 5, first embodiments of the output interface unit 14 and second converter 10 are indicated. The unit 14 (FIG. 4) is adapted to first transmit an address code from address register 69 via gate 91 (when open), transformer 95 and transmitter 76 to receiver 107 (FIG. 5) of the converter 10. After such received address is verified as indicated below, the unit 14 transmits command digital data from a register 72 (FIG. 4) via gate 97 (when open) transformer 95 and transmitter 76 to the receiver 107 (FIG. 5). Such separate address and data messages are accompanied by clock pulses and parity bits in a manner analogous to that described in connection with FIGS. 2 and 3.

In particular, to start the address mode in the unit 14, a trigger 70 from the processor 8 causes the outpulsing of a relevant address code from the register 69 and simultaneously causes logic unit 75 to open address gate 91. The address code is thus converted and transmitted from transmitter 76 in serial form and applied to receiver 107 (FIG. 5). The receiver 107, like receiver 40 in FIG. 3, separates the received address and clock pulse information on separate lines 108 and 109, respectively.

The address on line 108 is converted back to parallel form in transformer 111 when the latter is opened, and such parallel address is compared in a unit 119 with a unique memory address associated with the illustrated converter and stored in memory 118. The opening of the transformer 111 is effected by a control indication from logic 24 (FIG. 4) arriving with the address code in the reciever 107 and applied, via transformer 112 and decoder 113, to line 114. At this time, a second output 115 of the decoder 113 also conditions a gate 116.

The occurrence of a coincidence between the address arriving in the comparator 119 from the transformer 111 and the stored address in memory 118 operates the conditioned gate 116 to open another serial to parallel transformer 110, so that the latter may receive subsequently applied command data from the interface unit 14.

Such coincidence is also effective to trigger logic 120 to (a) open a gate 126 to send a verification signal from generator 127 back to the unit 14 via transformer 130 and transmitter 131, and (b) open a gate 128 to permit a subsequent verification of received command data as indicated below.

The verification signal from the generator 127, when received in the unit 14 (FIG. 4) serves to trigger logic 75 to open gate 85 for the purpose indicated below, and also to open gate 97 to permit the transmission of command data from register 72 to the converter 10 via transformer 95 and transmitter 76 along with the usual parity bit and clock pulse signals.

The command data received by receiver 107 (FIG. 5) is translated, after suitable parity checking, into parallel form by the now-enabled transformer 110 and applied to the input of a digital to analog translator 123, whose output is coupled to an actuation unit 3 (FIG. 1) associated with the system 1. At this time, a replica of the converted command data is also transmitted back to the interface unit via the now open gate 128 (FIG. 5), the transformer 130 and the transmitter 131.

When such transmitted replica is recovered in receiver 78 (FIG. 4) of the unit 14, it is converted (after a parity check) into parallel form in a transformer 87 and applied to one input of a comparator 80. Here, such replica is compared with the original command data from the register 72, which is coupled to the comparator 80 via the now-open gate 85.

If the resulting comparison shows a coincidence between the stored command data in the unit 14 and the received replica of the data from the converter 10, the logic 75 is triggered to outpulse a data transfer signal to the converter 10.

Such data transfer signal is converted and decoded in the converter 10 (FIG. 5) by units 112 and 113, respectively. The resulting output on line 122 of the decoder 113 is effective to actuate the translator 123 and cause it to convert to analog form, the digital command data at its input. Such analog data is then coupled to the associated actuation unit 3.

FIGS. 6 and 7 are alternative embodiments of the interface unit 14 and converter 10, respectively. A coded address is first entered in a common register 136 (FIG. 6) which is used to initially store the coded address and later to store the command data. The stored address in register 136 is applied through a decoder 139 to cause logic 75 to open gates 138 and 141 and to enable format counter 100. Accordingly, the address code, accompanied by suitable orders at appropriate times on line 140, is converted to serial form by transformer 95 and transmitted, along with clock pulses from the counter 100, to the converter 10 via transmitter 76.

The transmitted address received in receiver 107 (FIG. 7) is entered in a serial-parallel transformer 145. If the usual parity check is successful, such entered address is compared in unit 148 with a prescribed internal address code unique to the associated converter. A coincidence of these quantities triggers flip-flop 149, and the resulting change of state of the latter causes logic 120 to open gate 157.

This permits the transmission of a first "ready" signal from generator 158 back to the interface unit 14 via transformer 130 and transmitter 131. Such first ready signal, after reception, conversion and decoding in units 78, 87 and 142 (FIG. 6) of the unit 14, is applied via line 143 to logic 75. The logic 75 thereupon triggers a line 165 to the central processing unit 8 to effect the reading of suitable command data into the register 136. Such data is applied through the now-open gate 138, transformer 95 and transmitter 76 to the receiver 107 (FIG. 7) of the converter 10.

Such received data is entered in serial to parallel converter 145 and, if its parity is correct, the logic 120 is triggered to enable transformer 152 via line 153. The information thus applied to the transformer 152 (in parallel with the transformer 145) is then decoded in unit 154 to trigger logic 120 via line 155. The logic 120 responds by again enabling gate 157 to permit a second "ready" signal from the generator 158 to be applied to the unit 14 (FIG. 6).

This second ready signal, when received and decoded in the unit 14, triggers logic 75 to outpulse, via line 140 and gate 141, an execution signal. Such execution signal is transmitted to the converter 10 (FIG. 7) in the usual manner and, after conversion and decoding in the units 152 and 154, respectively, triggers logic 120 via line 156.

The logic 120 thereupon (1) enables, via line 163, the digital to analog translator 123 to translate the command data previously stored therein to analog form for use in the actuation unit 3, and (2) opens gate 159 to permit a "message executed" signal from generator 160 to be transmitted to the interface unit 14. Such signal, when received, converted and decoded in units 78, 87 and 142 (FIG. 6) of unit 14, is effective over line 144 to command the logic 75 to reset the various components of the unit 14 so that such unit can receive a new address-data message sequence for a succeeding converter 10.

In the foregoing, the invention has been described in connection with preferred arrangements thereof. Various modifications will now occur to those skilled in the art. It is accordingly desired that the scope of the appended claims not be limited to the specific disclosure herein contained.

What is claimed is:

1. In a closed loop apparatus including a digital processing unit for regulating a system having M-inputs and N-outputs and responsive to analog signals applied to its inputs for generating analog signals at its outputs, said regulating apparatus including M actuation means responsive to commands generated by the processing unit for applying analog signals to the inputs of the system and N detecting means for measuring the resulting analog output signals of the system for application to the unit, an improved arrangement for coupling the output of the detecting means to the processing unit, which comprises:

N first converters each having first normally unconditioned means operable when conditioned for translating an analog signal applied to a first input thereof to a corresponding digital signal at its output, and first guard means responsive to the application of a digital address code thereto for conditioning the first translating means for operation;

means for individually applying the outputs of the N detecting means to the first inputs of each of the N first translating means;

first means for applying uniquely associated address codes from the processing unit to each of the first guard means to condition the associated first translating means for operation; and means associated with the processing unit and responsive to the conditioning of the first translating means for effecting the operation of the first translating means.

2. In a closed loop apparatus including a digital processing unit for regulating a system having M-inputs and N-outputs and responsive to analog signals to its inputs for generating analog signals at its outputs, said regulating apparatus including M actuation means responsive to commands generated by the processing unit for applying analog signals to the inputs of the system and N detecting means for measuring the resulting analog output signals of the system for application to the processing unit, an improved arrangement for coupling the outputs of the detecting means to the processing unit and for coupling the commands generated by the processing unit to the actuation means which comprises:

N first converters each having first normally unconditioned means operable when conditioned for translating an analog signal applied to a first input thereof to a corresponding digital signal at its output, and first guard means responsive to the application of a digital address code thereto for conditioning the first translating means for operation;

N second converters each having second normally unconditioned means operable when conditioned for translating a digital signal applied to a first input thereof to a corresponding analog signal at its output, and a second guard means responsive to the application of a digital address code thereto for conditioning the second translating means for operation;

means for individually applying the outputs of the N detecting means to the first inputs of each of the N first translating means;

means for individually applying the outputs of the M second converters to the inputs of the M actuation means;

first means for applying uniquely associated address codes from the processing unit to each of the first guard means to condition the associated first translating means for operation;

second means for applying uniquely associated address codes from the processing unit to each of the second guard means to condition the associated second translating means for operation;

first means associated with the processing unit and rendered effective upon the conditioning of the first translating means for effecting the operation of the first translating means;

means associated with the processing unit and rendered effective upon the conditioning of the second translating means for applying digital commands from the processing unit to the first input of the second translating means; and second means associated with the processing unit and rendered effective upon the receipt of the digital commands by the second translating means for effecting the operation of the second translating means.

3. Apparatus as defined in claim 2, in which the second operation effecting means comprises, in combination, means responsive to the receipt of the command data at the second translating means for generating a replica of the received command data to the processing unit, and means for comprising a stored version of the command data with the transmitted replica of such data, the occurrence of the coincidence between the stored command data and the replica effecting the operation of the second translating means.

4. Apparatus as defined in claim 2, in which each first converter comprises means for suppressing portions of the output digital signal which represent analog output signals from the detecting means having a magnitude outside a predetermined useful range.

5. Apparatus as defined in claim 2, in which the second conditioning means comprises, in combination, a first digital address register responsive to digital address codes; means for comparing the contents of the first register with a stored digital word representative of the address of the associated second converter and for generating a control indication representative of a coincidence therebetween; a second normally closed data register for receiving digital commands to be translated; and means responsive to the occurrence of the control indication for opening the second register.

6. Apparatus as defined in claim 2, in which the first conditioning means are arranged to apply address codes to the first guard means of all the first converters in sequence, and in which the first operation effecting means associated with each first converter is rendered effective in timed relation to the operation of the first translating means associated with the preceding first converter in the sequence.

* * * * *